(12) United States Patent
Phillips et al.

(10) Patent No.: US 7,849,872 B2
(45) Date of Patent: Dec. 14, 2010

(54) KEYED FLUID CONNECTOR AND FLUID DISPENSING SYSTEM

(75) Inventors: Kyle Phillips, Newfane, NY (US); Jeffrey Grisante, North Tonawanda, NY (US); Marvin Wile, Cheektowaga, NY (US)

(73) Assignee: Greatbatch Ltd., Clarence, NY (US)

( * ) Notice: Subject to any disclaimer, the term of this patent is extended or adjusted under 35 U.S.C. 154(b) by 727 days.

(21) Appl. No.: 11/837,707

(22) Filed: Aug. 13, 2007

(65) Prior Publication Data

US 2009/0045622 A1  Feb. 19, 2009

(51) Int. Cl.
*B67D 7/72* (2010.01)
(52) U.S. Cl. .................. 137/212; 285/374; 222/399
(58) Field of Classification Search .......... 137/212, 137/206, 209; 141/59, 65, 98, 104, 105; 184/1.5; 285/282, 305, 308, 317, 374; 222/132, 222/135, 394, 399
See application file for complete search history.

(56) References Cited

U.S. PATENT DOCUMENTS

| | | | | |
|---|---|---|---|---|
| 4,619,640 | A | * 10/1986 | Potolsky et al. | ............... 604/7 |
| 5,871,028 | A | * 2/1999 | Liu | ........................... 137/209 |
| 6,079,597 | A | * 6/2000 | Rauworth et al. | ........ 222/400.7 |
| 7,025,234 | B2 | * 4/2006 | Priebe et al. | ............ 222/400.7 |

* cited by examiner

*Primary Examiner*—Craig M Schneider
(74) *Attorney, Agent, or Firm*—Steven W. Winn

(57) ABSTRACT

Multiple unique keyed fluid connectors that are not cross-connectable with each other are described. Each keyed fluid connector comprises a first body including a first mating surface and having a first fluid fitting disposed in a first port in the first mating surface; a second body including a second mating surface opposable to the first mating surface and having a second fluid fitting disposed in a second port in the second mating surface, the second fluid fitting connectable to the first fluid fitting; and a keying feature comprising at least a first pin extending from one of the first and second bodies and disposable in a first hole in the other of the first and second bodies. The connectors are particularly useful in providing a robust system for selecting a particular electrolyte from among several containers of different electrolytes, and dispensing it into an implantable power device.

17 Claims, 5 Drawing Sheets

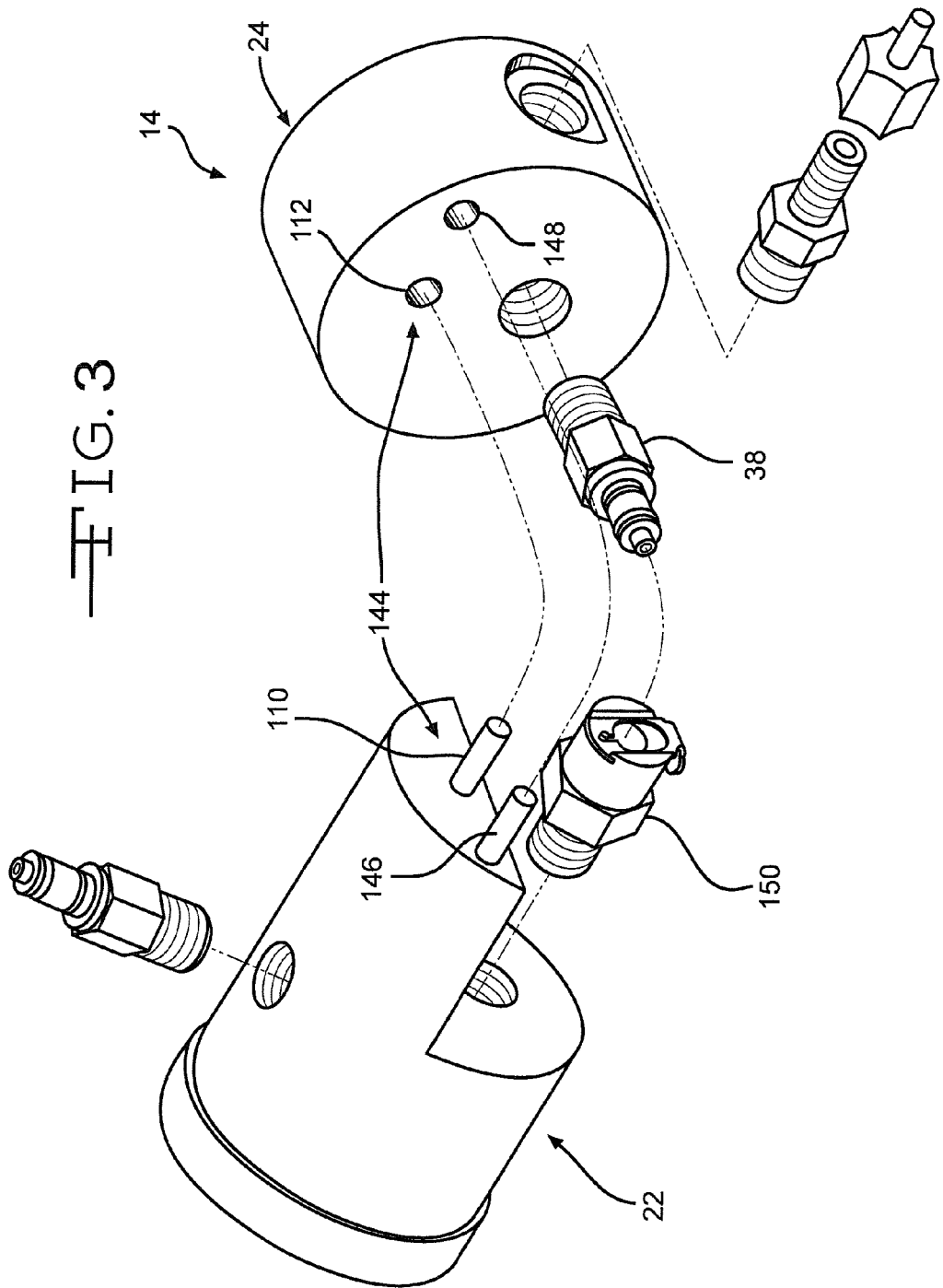

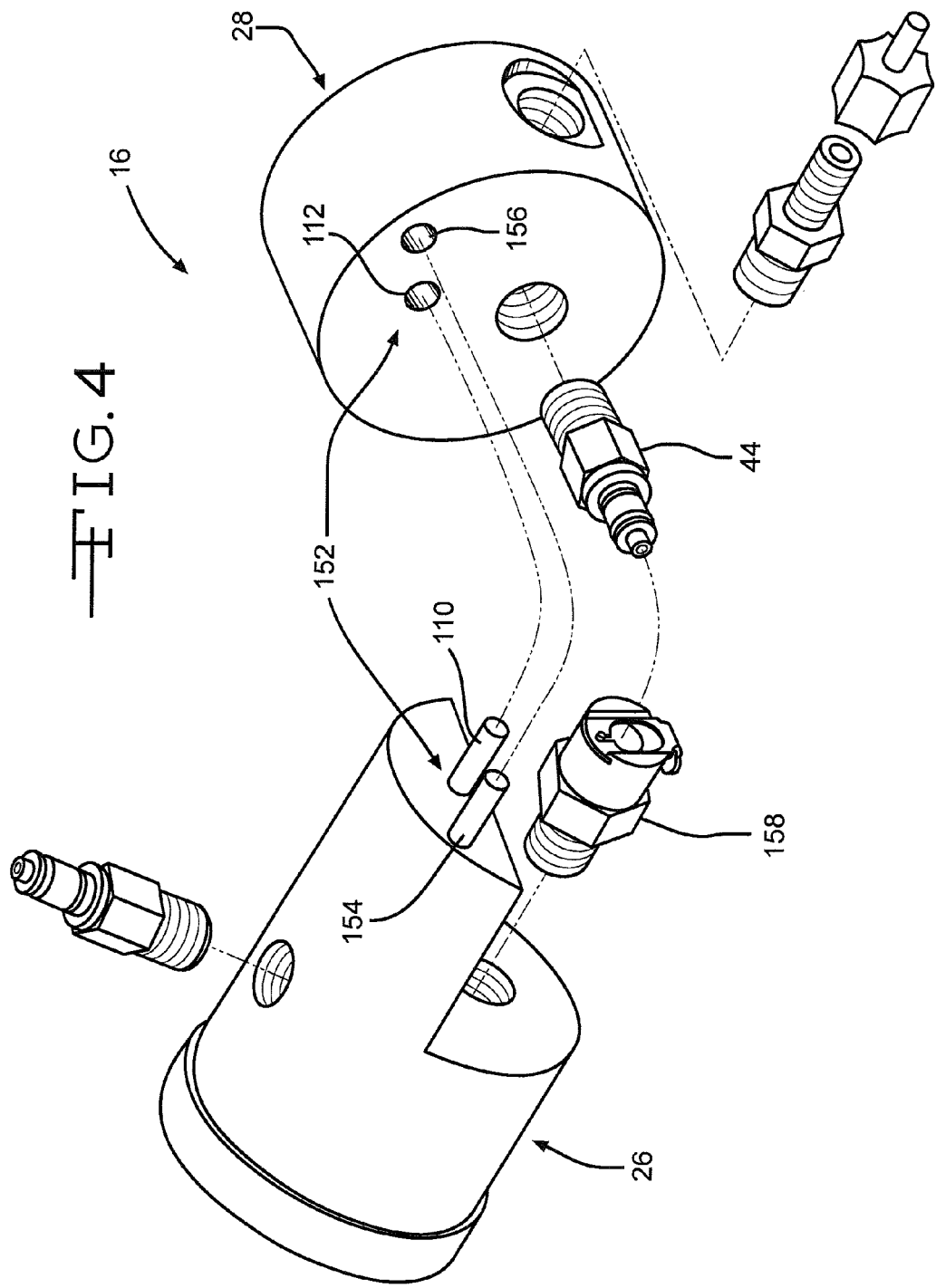

KEYED FLUID CONNECTOR AND FLUID DISPENSING SYSTEM

BACKGROUND OF THE INVENTION

1. Field of the Invention

The present invention relates generally to a fluid connector that is connectable to a small container, and a fluid dispensing system comprised of multiple containers with mutually exclusive fluid connectors. More particularly, the present invention relates in one embodiment to a connector for fitting to a bottle, and a system for dispensing a liquid electrolyte into an electrochemical cell or capacitor selected from several bottles of different electrolytes. The connectors on each of the bottles differ from each other such that errors in connecting the bottles to their respective delivery conduits are prevented. Electrolyte cross-contamination is avoided and consistent filling of a particular cell or capacitor with the desired electrolyte is enabled.

2. Description of Related Art

In the manufacturing of electrochemical cells, such as those used to power implantable medical devices, a variety of models may be produced by a single manufacturing system in order to achieve desired economies of scale. The various models of cells/capacitors typically require different liquid electrolytes; no single liquid electrolyte is suitable for activation of the cathodes and anodes of different cells. Therefore, the manufacturing production line must be provided with a liquid dispensing system configured for the selective dispensing of the correct electrolyte into a particular cell.

In such a production line, the various electrolytes must be stored in containers which include fittings that are connectable to the respective fluid supply conduits for electrolyte delivery. The fittings are preferably "quick-connect" fittings, which enable the rapid replacement of spent electrolyte containers with filled ones. If all of the quick-connect fittings provided on the containers and supply conduits are identical, then it is possible for an electrolyte supply container to be connected to the wrong supply conduit. Cross-contamination of the electrolyte and the filling of a particular cell or cells with the wrong electrolyte can occur. Careful attention to detail by manufacturing personnel is required to prevent such errors; however, given enough time, it is highly probable that errors will occur. Defective product and/or unsafe conditions may result.

Matched or "keyed" quick-connect fittings can be provided wherein a given male fitting will only couple to a correspondingly matched female fitting. Each electrolyte container and corresponding supply conduit can be provided with a particular matched fitting pair, such that cross-connection errors are prevented. Such keyed quick-connect fittings are known. For example, keyed quick-connect fittings are manufactured and sold by the Swagelok® Corporation of Solon, Ohio.

However, keyed quick-connects have certain disadvantages. In instances where small amounts of fluid are to be delivered, keyed quick-connects have relatively large, bulky bodies, and are not optimum for use in the compact systems provided for electrolyte filling of implantable cells. They are also expensive, such that having a full set of matched fittings and spares in inventory may be a significant cost. The number of keyed pairs of fittings provided by a given manufacturer is also limited. For example, the Swagelok® Corporation offers a choice of seven matched pairs of keyed quick-connects in one of their product lines. If the number of liquid electrolytes to be dispensed exceeds the available number of keyed quick-connects, a foolproof dispensing system cannot be provided.

Simple, non-keyed quick-connects are much more compact and less expensive. However, they enable cross-connection errors to be made in electrolyte dispensing. What is needed is a fluid connector, a dispensing container/fluid connector assembly, and a dispensing system that uses simple and inexpensive off-the-shelf quick-connect fittings, but that also prevents cross-connection errors.

It is noted that this problem is not unique to electrolyte filling of electrochemical cells for implantable devices. The problem, and the present invention that addresses it, are also applicable to electrolyte filling of other implantable power devices such as electrochemical capacitors, and to a variety of other precision fluid dispensing applications. Such applications may involve, for example, semiconductor manufacturing, automated immunoassays, thin film coating, and the like. Although the following description is directed to the problem of electrolyte dispensing to electrochemical cells, it is to be understood that the present invention is not to be construed as being limited only to such a use, and is broadly applicable to the art of fluid dispensing in general.

SUMMARY OF THE INVENTION

The present invention meets the aforesaid need by providing a keyed fluid connector comprising a first body including a first mating surface and having a first fluid fitting disposed in a first port in the first mating surface; a second body including a second mating surface opposable to the first mating surface and having a second fluid fitting disposed in a second port in the second mating surface, the second fluid fitting connectable to the first fluid fitting; and a keying feature comprising at least a first pin extending from one of the first or second bodies and disposable in a first hole in the other of the first or second bodies.

One of the first or second bodies may include a boss extending from the mating surface thereof and forming a recess containing portions of the first fluid fitting and the second fluid fitting. The pin-and-hole arrangement of the keying feature is preferably located such that when the first fluid fitting is connected to the second fluid fitting, the first pin is engaged with the boss. The first or second bodies may be made such that the first pin is formed integrally with and extends from the mating surface of one of the first or second bodies. Alternatively, the first pin may be a separate rigid pin that is joined by an interference fit into one of the first or second bodies. The keying feature may be further comprised of a second pin extending from one of the first or second bodies and disposable in a second hole in the other of the first or second bodies, in a second pin-and-hole arrangement. The keying feature may be comprised of additional pin-and-hole arrangements.

When in use, the first fluid fitting and the second fluid fitting are connected to each other to allow fluid to pass therethrough. In one preferred embodiment, the first and second fittings are provided as a quick-connect fitting assembly.

The first body of the keyed connector may be provided with a connection end including a port in communication with the first fluid fitting, so that fluid may be received from a source and delivered through the first fluid fitting. In like manner, the second body may be further comprised of a port in communication with the second fluid fitting, so that fluid may be delivered through the second fluid fitting and on out through the port. The connection end may also include an additional port in communication with an additional fluid fitting disposed in the first body, so that an additional fluid such as a gas may be transported through the first body.

In one preferred embodiment, the connection end is provided with a retainer flange and a cap that is engageable with a fluid container. The connection end may further include a recessed groove for receiving a seal that is sealable with the fluid container. With these features, the keyed connector may be joined and sealed to the fluid container, and used to transfer a fluid such as liquid electrolyte from the container to a destination such as an internal cavity of an electrochemical cell.

In accordance with the present invention, there is further provided a system for selecting and dispensing two or more liquids comprising a first keyed fluid connector and a second keyed fluid connector. The first keyed fluid connector is comprised of a first body including a first mating surface and having a first fluid fitting disposed in a first port in the first mating surface, a second body including a second mating surface opposable to the first mating surface and having a second fluid fitting disposed in a second port in the second mating surface, the second fluid fitting connectable to the first fluid fitting; and a first keying feature comprising at least a first pin extending from one of the first or second bodies and disposable in a first hole in the other of the first or second bodies. The second keyed fluid connector is comprised of a third mating surface and having a third fluid fitting disposed in a third port in the third mating surface, a fourth body including a fourth mating surface opposable to the third mating surface and having a fourth fluid fitting disposed in a fourth port in the fourth mating surface, the fourth fluid fitting connectable to the third fluid fitting; and a second keying feature comprising at least a second pin extending from one of the third or fourth bodies and disposable in a second hole in the other of the third or fourth bodies. The first keying feature differs from the second keying feature, thereby preventing either of the first or second body from being connected to either of the third or fourth body.

Depending upon its intended use, the fluid dispensing system includes one or more additional components. The system may include a conjoining fitting including a first inlet branch in fluid communication with the second fluid fitting of the first keyed fluid connector, a second inlet branch in fluid communication with the fourth fluid fitting of the second keyed fluid connector, and an outlet branch. The conjoining fitting may be a simple pipe or compression tee. For the dispensing of one electrolyte to be selected from two or more choices, the conjoining fitting is preferably a selector valve that is capable of receiving a first electrolyte through the first inlet branch, and a second electrolyte through the second inlet branch, and directing the selected one of the two electrolytes through the outlet branch.

The system may further comprise a dispensing valve that is connectable to a fill port of an implantable power device and in fluid communication with the outlet branch of the selector valve. A vacuum pump may also be provided for evacuating the implantable power device prior to filling it with electrolyte. In this instance, the vacuum pump is connected to the fill port of the implantable power device through the dispensing valve, which may function as another selector valve. The dispensing valve first connects the vacuum pump to the implantable power device to evacuate the air contained therein, and then connects the power device to the selector valve, so that the selected electrolyte is dispensed into the power device container.

The keyed fluid connectors may be configured to be connected directly to containers of fluid. A first fluid container may be connected to the first body of the first keyed fluid connector, and a second fluid container may be connected to the third body of the second keyed fluid connector. A gas supply may be provided for pressurizing the fluid containers, thereby providing supplemental "boost" pressure to assist in the delivery of liquids therefrom. The keyed fluid connectors are preferably configured such that the gas supply is in communication with the first fluid container through the first body of the first keyed fluid connector, and with the second fluid container through the third body of the second keyed fluid connector.

Thus, one preferred and highly featured system for selecting and dispensing electrolyte into an implantable power device is comprised of first and second keyed fluid connectors as recited previously; a first fluid container connected to the first body of the first keyed fluid connector, and a second fluid container connected to the third body of the second keyed fluid connector; a selector valve including a first inlet port in fluid communication with the second fluid fitting of the first keyed fluid connector, a second inlet port in fluid communication with the fourth fluid fitting of the second keyed fluid connector, and an outlet port; a dispensing valve connectable to a fill port of the implantable power device and in fluid communication with the outlet branch of the selector valve; a vacuum pump connectable to the fill port of the implantable power device through the dispensing valve; and a gas supply in communication with the first fluid container and the second fluid container.

The system may be further provided with additional uniquely keyed fluid connectors and containers that are connected to the selector valve, so that additional choices of electrolyte may be provided, selected, and dispensed as needed, depending upon the number of different implantable power devices that are being manufactured in the process.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 3 is a second keyed fluid connector of the present invention; and

FIG. 4 is a third keyed fluid connector of the present invention.

The present invention will be described in connection with preferred embodiments; however, it should be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

Figure 1:
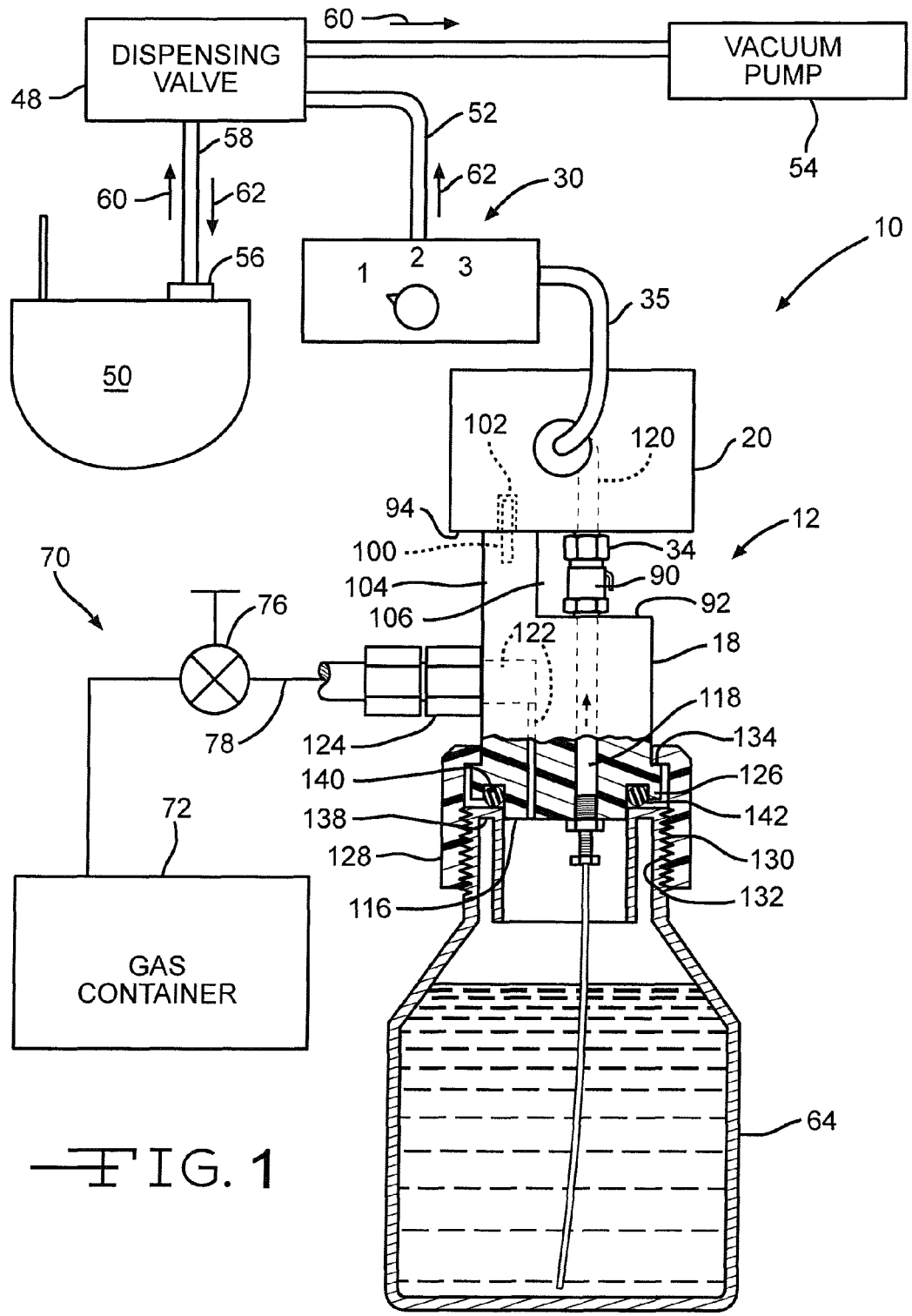
FIG. 1 is a schematic illustration of a system of the present invention for dispensing electrolyte into an electrochemical cell, including a cross-sectional view of one preferred connection of a container to a keyed fluid connector of the present invention.

Referring now to the drawings, FIG. 1 is a schematic of a system 10 of the present invention for dispensing electrolyte into an implantable medical power device, such as an electrochemical cell or capacitor. In a broader sense, the system of the present invention may be used for a variety of other precision fluid dispensing applications as noted previously herein.

The dispensing system 10 is comprised of a first keyed fluid connector 12, and a second keyed fluid connector 14. If more than two liquids are to be dispensed, system 10 may include additional fluid connectors such as fluid connector 16, and associated components. Each of the fluid connectors 12, 14 and 16 are provided with unique keying features that prevent errors from occurring in connecting the pairs of bodies of the fluid connectors to each other. The bodies 18 and 20 of keyed connector 12 are connectable only to each other. In like manner, the bodies 22 and 24 of keyed connector 14 are connectable only to each other, and the bodies 26 and 28 of keyed connector 16 are connectable only to each other. The details of these keyed connectors will be described subsequently in this specification with reference to FIGS. 2 to 4. However, the remaining features of system 10 will be described first, with reference to FIGS. 1 and 1A.

System 10 may include a conjoining fitting 30 comprised of a first inlet branch 32 in fluid communication with fluid fitting 34 of the first keyed fluid connector 12 through conduit 35, a second inlet branch 36 in fluid communication with fluid fitting 38 of the second keyed fluid connector 14 through conduit 39, and an outlet branch 40. In instances where the fluids to be dispensed are being blended, or some degree of cross-contamination is acceptable, the conjoining fitting 30 may be a simple pipe or compression tee. If a third fluid is to be dispensed, such as through keyed connector 16, conjoining fitting 30 may be formed as a manifold block and include a third inlet branch 42 in fluid communication with fluid fitting 44 of the third keyed fluid connector 16 through conduit 45. Additional inlet branches may be provided in conjoining fitting 30 as needed for the dispensing of additional fluids.

For precision dispensing applications in which a single fluid is to be selected from two or more choices, such as in the dispensing of electrolytes, the conjoining fitting 30 is preferably a selector valve that is capable of receiving a first electrolyte through the first inlet branch 32, 36 or 42 or a second electrolyte through the second inlet branch 36, or optionally a third electrolyte through third inlet branch 42. The selection actuator 46 is positioned to select and internally connect one of the inlet branches 32, 36 or 42 to the outlet branch 40. Actuator 46 may be positionable by hand, or by a suitable electrical or mechanical actuator, such as a solenoid or a pneumatic cylinder. Spool valves, ball valves, or disc valves may be configured as suitable selector valves.

The system may further comprise a dispensing valve 48 that is connectable to the fill port (not shown) of an implantable power device 50. Dispensing valve 48 is in fluid communication with the outlet branch 40 of the selector valve 30 through conduit 52. A vacuum pump 54 may also be provided for evacuating the implantable power device 50, prior to filling it with electrolyte. In this instance, vacuum pump 54 is connected to the fill port of the implantable power device 50 through dispensing valve 48. A seal 56 may be provided to temporarily seal conduit 58 to the fill port.

In this configuration the dispensing valve 48 functions as another selector valve. Dispensing valve 48 first connects vacuum pump 54 to the implantable power device 50 to evacuate the air contained therein as indicated by arrows 60, and then connects the power device 50 to the selector valve 30 so that the selected electrolyte is dispensed into the device 50 as indicated by arrows 62.

The keyed fluid connectors 12, 14 and 16 may be configured to be connected directly to containers of fluid. A first fluid container 64 may be connected to body 18 of the first keyed fluid connector 12, a second fluid container 66 may be connected to body 22 of the second keyed fluid connector 14, and a third fluid container 68 may be connected to body 26 of the third keyed fluid connector 16. This capability is particularly useful in selection and dispensing of electrolytes to implantable power devices. In such an operation, container 64 holds a first electrolyte, container 66 holds a second electrolyte, and container 68 holds a third electrolyte. The system 10 may be provided with as many containers of different electrolytes and keyed fluid connectors as needed for the manufacturing of a range of implantable power devices.

A gas supply 70 may be provided for pressurizing the fluid containers 64, 66 and 68, thereby providing supplemental "boost" pressure to assist in the delivery of liquids therefrom. Gas supply 70 is comprised of a gas container 72, which contains a compressed gas such as compressed air. Gas container 72 may be a stand-alone cylinder of gas or a reservoir tank that is part of a compressed air system in the manufacturing facility. Gas supply 70 is further comprised of a pressure regulator 74, a first valve 76 and conduit 78 connecting gas container 72 with fluid container 64, a second valve 80 and conduit 82 connecting gas container 72 with fluid container 66, and a third valve 84 and conduit 86 connecting gas container 72 with fluid container 68. The keyed fluid connectors are preferably configured such that the gas supply 70 is in communication with the first fluid container 64 through the body 18 of the first keyed fluid connector 12, and with the second fluid container 66 through the body 22 of the second keyed fluid connector 14, and with the third fluid container 68 through the body 26 of the third keyed fluid connector 16.

Figure 2:
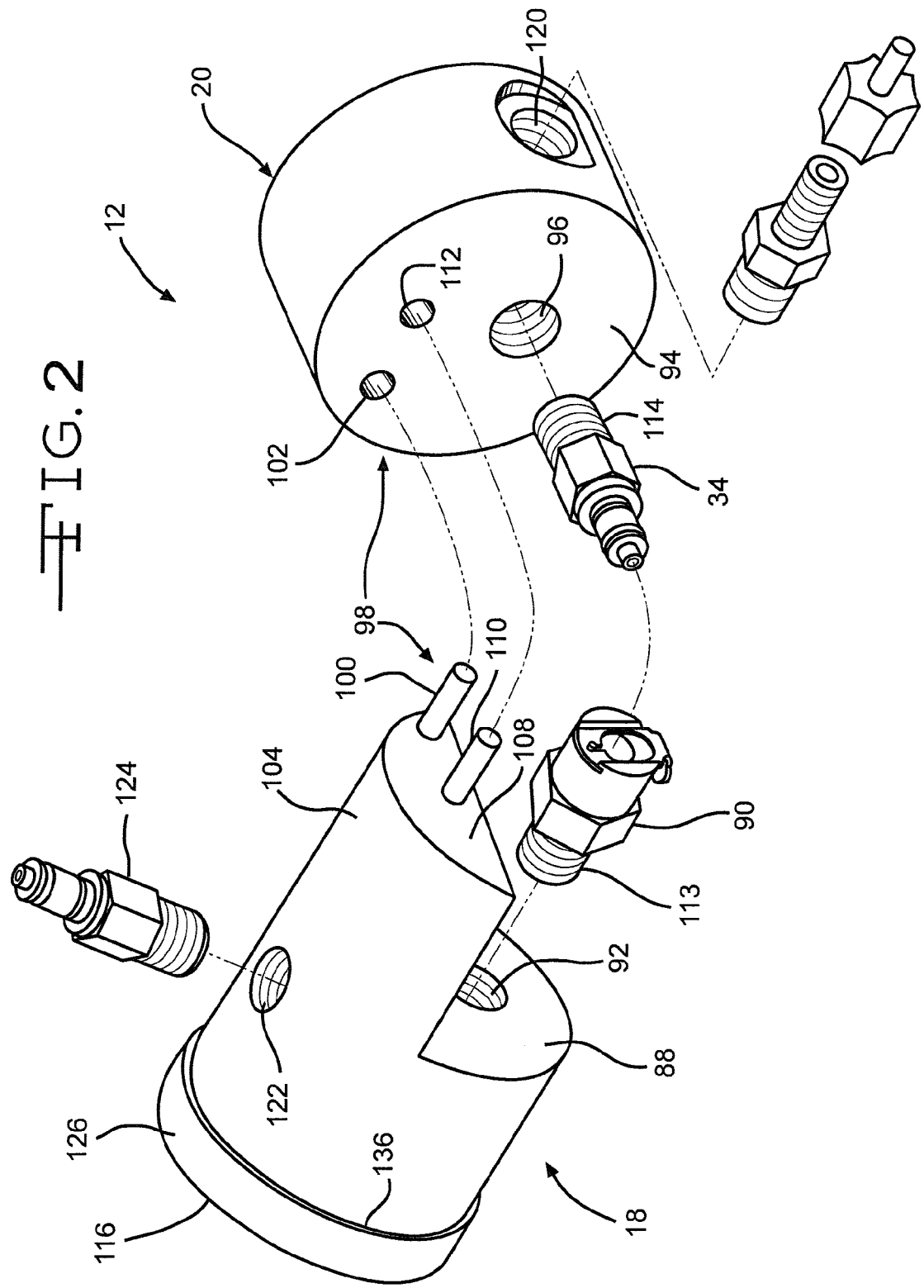
FIG. 2 is a first keyed fluid connector of the present invention.

Use of the keyed fluid connectors in the dispensing system 10 will now be described. FIG. 2 is a first exemplary keyed fluid connector of the present invention. Keyed fluid connector 12 is comprised of a first body 18 and a second body 20. First body 18 includes a first mating surface 88 having a first fluid fitting 90 disposed in a first port 92 therein. Second body 20 includes a second mating surface 94 opposable to the first mating surface 88 and having a second fluid fitting 34 disposed in a second port 96 therein. The second fluid fitting 34 is connectable to the first fluid fitting 90 when the keyed fluid connector 12 is assembled and in use.

Keyed fluid connector 12 further includes a keying feature 98 comprising at least a first pin 100 extending from one of the first or second bodies and disposable in a first hole in the other of the first or second bodies. In the embodiment depicted in FIG. 2, pin 100 extends from the first body 18 and is disposed in hole 102 in the second body 20 when keyed fluid connector 12 is assembled. It will be apparent that pin 100 could extend from body 20, and corresponding hole 102 could be provided in body 18 to achieve the same result.

Referring also to FIG. 1, one of the first body 18 or second body 20 may include a boss 104 extending from the mating surface thereof and forming a recess 106 containing the exposed portions of the first fluid fitting 90 and the second fluid fitting 34. In the embodiment depicted in FIGS. 1 and 2, boss 104 extends from first body 18. It will again be apparent that boss 104 could extend from second body 20 to achieve the same result.

Providing the keyed fluid connector 12 with the boss 104 results in a stronger and more robust assembly. The mated fluid fittings 34 and 90 are contained and protected in the recess 106 formed by boss 104. Additionally, the distal surface 108 of boss 104 may be in contact, or nearly in contact with mating surface 94 of body 20. The pin-and-hole arrangement of the keying feature 98 is also preferably located within boss 104 such that when the first fluid fitting 90 is connected to the second fluid fitting 34, pin 100 is engaged with the boss 104. In the embodiment depicted in FIG. 2, pin 100 is embedded in boss 104, although as noted previously, the pin and hole arrangement could be reversed.

Thus, when the keyed fluid connector 12 is assembled and in use as shown in FIG. 1, if it is subjected to a side impact, the force of the impact is borne by the relatively short pin 100, which is closely fitted within hole 102, and/or by the contact between surface 108 of boss 104 with mating surface 94. If boss 104 were not provided, body 18 would be separated from body 20 by the length of the exposed portions of fittings 90 and 34. Pin 100 would also need to be considerably longer as well. Such a configuration would be disadvantageous because much of the force of a side impact would be borne by the fittings 90 and 34. The sealing between the fittings could be damaged, or one of the fittings could snap off. Either result would cause spillage of electrolyte and manufacturing downtime to correct the problem.

In one embodiment (not shown), one of the first or second bodies may be made such that the first pin 100 is formed integrally with and extends from the mating surface thereof to mate with the corresponding hole in the other body. Alternatively, the first pin 100 may be a separate rigid pin that is joined by an interference fit, threaded, or glued into one of the first or second bodies. In the embodiment depicted in FIG. 2, the first pin 100 is press fitted into a first hole provided in boss 104.

Keying feature 98 may be further comprised of a second pin extending from one of the first or second bodies and disposable in a second hole in the other of the first or second bodies, in a second pin-and-hole arrangement. In keyed fluid fitting 12 of FIG. 2, second pin 110 is press fitted into a second hole provided in boss 104, and corresponding receiving hole 112 is provided in body 20. Keying feature 98 may be further comprised of additional pin-and-hole arrangements.

Bodies 18 and 20 and pins 100 and 110 may be made of any material that is of sufficient structural strength and chemically resistant to the fluid that is being transported through keyed fluid connector 12. In the present application for the dispensing of electrolytes, bodies 18 and 20 are preferably made of a polymer, such as high molecular weight polypropylene, and pins 100 and 110 are made of stainless steel.

When keyed fluid connector is in use as shown in FIG. 1, the first fluid fitting 90 and the second fluid fitting 34 are connected to each other to allow fluid to pass therethrough. First fluid fitting 90 and second fluid fitting 34 may be provided as a pipe union assembly or a compression fitting assembly. Such fittings are not preferred because they require hand tools to assemble and seal to each other. In the preferred embodiment of FIG. 2, the first fitting 90 and the second fitting 34 are provided as a quick-connect fitting assembly, wherein fittings 90 and 34 are snapped together and seal to each other when the pins and holes of key feature 98 are aligned. The quick-connect assembly is preferably a "dry" quick-connect assembly, i.e. flow though both fitting 90 and fitting 34 is prevented when they are not coupled together. In this manner, spillage of small drops of electrolyte is prevented when fittings 90 and 34 are disconnected from each other. Such quick-connect fittings are well known in the art, and are available from manufacturers such as the Swagelok Corporation of Solon, Ohio, or the Colder Products Company of St. Paul, Minn. Fittings 90 and 34 are joined to respective bodies 18 and 20 by pipe thread portions 113 and 114. Ports 92 and 96 are correspondingly threaded to receive and seal fittings 90 and 34 to bodies 18 and 20. Other suitable means of configuring and sealing fittings 90 and 34 to bodies 18 and 20 may be used, such as those used on SAE or ISO type fittings.

The first body 18 of the keyed fluid connector 12 may be provided with a connection end 116 including a port 118 in communication with the first fluid fitting 90, so that fluid may be received from a source and delivered through first fluid fitting 90. In like manner, the second body 20 may be further comprised of a port 120 in communication with the second fluid fitting 34, so that fluid may be delivered through the second fluid fitting 34 and on out through port 120. The connection end 116 may also include an additional port 122 in communication with an additional fluid fitting disposed 124 in the first body 18. In this manner, an additional fluid such as a gas from gas supply 70 may be transported through the first body 18 as described previously herein.

Figure 1A:
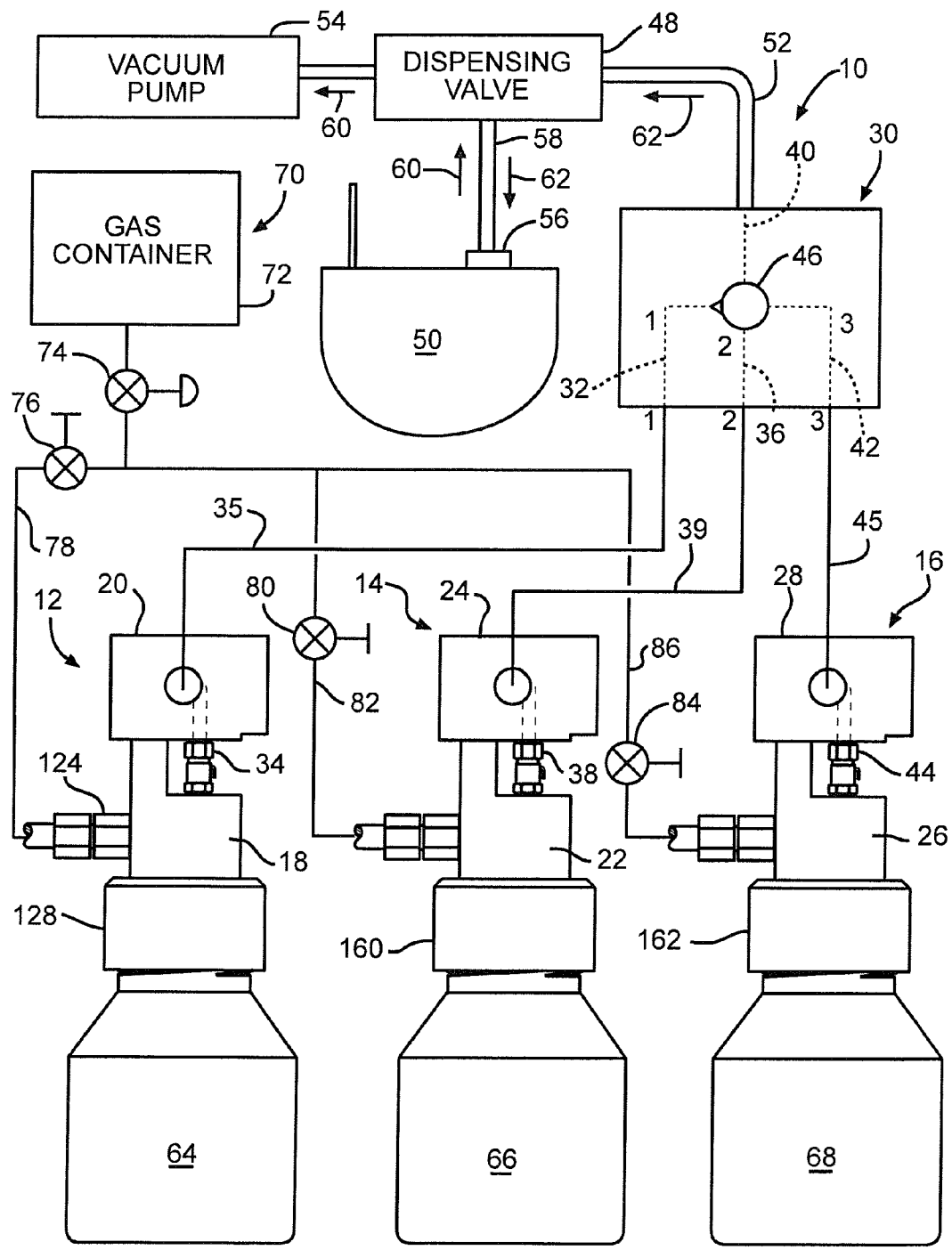
FIG. 1A is an alternative view of the system of FIG. 1, showing a plurality of containers of different electrolytes which may be selected for dispensing into the electrochemical cell.

The keyed fluid connector 12 as described to this point may be used in a variety of fluid handling operations. In an application wherein an electrolyte is dispensed from a container, it is preferable that the keyed fluid connector be directly connected to the container, as depicted in FIGS. 1 and 1A. Connection end 116 is provided with a retainer flange 126 and a cap 128 that is engageable with a fluid container 64. In one embodiment, cap 128 includes threads 130 that engage with corresponding threads 132 on container 64.

When cap 128 is threaded onto the container 64, an inner edge 134 of the cap 128 engages with shoulder 136 of flange 126, thereby forcing body 18 of the keyed fluid connector 12 against the mouth 138 of container 64. Connection end 116 of body 18 preferably further includes a recessed groove 140 for receiving a seal 142 that is sealable with the mouth 138 of fluid container 64. With these features, the keyed connector 12 may be securely joined and sealed to the fluid container 64, and used to transfer a fluid such as liquid electrolyte from the container 64 to a destination such as an internal cavity of an implantable power device 50.

The dispensing system 10 of FIGS. 1 and 1A includes at least two keyed fluid connectors having keying features that prevent the connector halves thereof from being inadvertently misconnected. Referring to FIGS. 2 and 3, the first keyed fluid connector 12 includes a first keying feature 98 comprising at least a first pin 100 extending from one of the first or second bodies 18, 20 and disposable in a first hole 102 in the other of the first body or second body. The second keyed fluid connector 14 is similar in construction to the first keyed fluid connector 12 with regard to the two bodies, mating surfaces, and fluid fittings thereof. The second keyed fluid connector 14 is further comprised of a keying feature 144 comprising at least one pin 146 extending from one of the bodies 22 or 24 and disposable in a corresponding hole 148 in the other of the bodies 22 or 24.

The first keying feature 98 of keyed fluid connector 12 differs from the second keying feature 144. It can be seen that the pin-and-hole combination 100/102 of the first keying feature 98 is located in a different position than that of the pin-and-hole combination 146/148 of the second keying feature 144. However, the position of the pin 110 and receiving hole 112 remains the same. Essentially, the pin 110 serves as a pivot pin. Thus, if one were to attempt to connect body 20 and fitting 34 of the first keyed connector 12 with body 22 and fitting 150 of second keyed connector, pin 146 would not align with hole 102, and such connection would be prevented.

In like manner, body 18 and fitting 90 of first keyed connector 12 cannot be connected to body 24 and fitting 38 of second keyed connector 14.

Referring now to FIG. 4, the third keyed fluid connector 16 is similar in construction to the first and second keyed fluid connectors 12 and 14. Third keyed fluid connector 16 is further comprised of a keying feature 152 comprising at least one pin 154 extending from one of the bodies 26 or 28 and disposable in a corresponding hole 156 in the other of the bodies 26 or 28. Pin-and-hole combination 154/156 of the third keying feature 152 is located in a different position than either of the pin-and-hole combinations 100/102 of the first keying feature 98 or 146/148 of the second keying feature 144. However, again the position of pivot pin 110 and hole 112 remains the same as on the other keying features. Thus, cross-connection of either of bodies 26 and 28 with their respective fittings 158 and 44 with the corresponding bodies/fittings of the first or second keyed fluid connectors 12/14 is prevented.

It should also be pointed out that while the positioning of pivot pin 110 and receiving hole 112 are common for the various keying features 98, 144 and 152, that is not necessary. They could be unique for a particular set of first and second mating keyed fluid connectors, although that is not preferred.

Referring again to FIGS. 1 and 1A, and in summary, one preferred system 10 for selecting and dispensing electrolyte into an implantable power device 50 is comprised of first and second keyed fluid connectors 12 and 14 as described herein; a first fluid container 64 connected to body 18 of the first keyed fluid connector 12, and a second fluid container 66 connected to the body 22 of the second keyed fluid connector 14; a selector valve 30 including a first inlet port 32 in fluid communication with the fluid fitting 34 of the first keyed fluid connector 12, a second inlet port 36 in fluid communication with the fluid fitting 38 of the second keyed fluid connector 14, and an outlet port 40; a dispensing valve 48 connectable to a fill port of the implantable power device 50 and in fluid communication with the outlet branch 40 of the selector valve 30; a vacuum pump 54 connectable to the fill port of the implantable power device 50 through the dispensing valve 48; and a gas supply 70 in communication with the first fluid container 64 and the second fluid container 66.

The system 10 may be further provided with additional uniquely keyed fluid connectors such as connector 16, and containers such as container 68 that are connected to the selector valve 30, so that additional choices of electrolyte may be provided, selected, and dispensed as needed, depending upon the number of different implantable power devices that are being manufactured in the process.

The operation of the dispensing system 10 is now described. System 10 is assembled as shown in FIGS. 1 and 1A. Each of the containers 64, 66, and 68 is filled with a different electrolyte and connected to its respective keyed fluid connector 12, 14 and 16. The threads on caps 128, 160, and 162 may differ from each other so that container connection errors are also prevented. Containers filled with the first electrolyte may have threads that only fit cap 128, so that a container of the first electrolyte cannot be connected to caps 160 or 162. In like manner, containers filled with the second electrolyte may be threaded to only fit cap 160, and containers filled with the third electrolyte may be threaded to only fit cap 162.

A small waste container is put in the system at the outlet of conduit 58 in place of an implantable power device 50. Valves 76, 80, and 84 are opened, and containers 64, 66, and 68 are pressurized by gas supply 70. Selector valve 30 is then operated, allowing the delivery of electrolytes through each of the keyed fluid connectors 12, 14 and 16 and associated conduits, in order to purge air from them. The selector valve 30 is then set to connect the desired container of electrolyte to the dispensing valve 48, and conduits 52 and 58 are fully primed with that electrolyte. Selector valve 30 may then be switched to a closed position.

Conduit 58 is then connected to the fill port of an implantable power device 50. Dispensing valve 48 is switched to connect the vacuum pump 54 to the power device 50, and the air contained in the casing of the device 50 is evacuated. The dispensing valve 48 is switched back to connect to the selector valve 30 and provide for flow of the desired electrolyte into device 50. When the power device 50 is sufficiently filled, the selector valve 30 is closed. In the event that additional electrolyte must be added to the power device 50, the evacuation cycle and the filling cycle may be repeated. The power device 50 is then disconnected from conduit 58, and another device 50 that is to receive the same electrolyte may be connected to conduit 58. The evacuation and filling cycle is repeated.

When a changeover to a different electrolyte must be done, the selector valve and the dispensing valve are operated as described previously to prime conduits 52 and 58 with that electrolyte. When an empty container is removed from the system, and replaced by a new container 64, 66 or 68 of that particular electrolyte, a purging cycle is performed using the selector valve 30 and dispensing valve 48 in order to purge all air bubbles from the associated fittings and conduits.

It is, therefore, apparent that there has been provided, in accordance with the present invention, a keyed fluid connector and a robust fluid dispensing system including two or more of the keyed fluid connectors, in which fluid cross-connection errors are prevented. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A keyed fluid connector comprising
a) a first body including a first mating surface and having a first fluid fitting disposed in a first port in the first mating surface;
b) a second body including a second mating surface opposable to the first mating surface and having a second fluid fitting disposed in a second port in the second mating surface, the second fluid fitting connectable to the first fluid fitting;
c) a boss extending from the mating surface of one of the first and second bodies to a distal boss surface thereby forming a recess between the first or second mating surface and the distal boss surface;
d) a keying feature comprising at least a first pin extending from the distal surface of the boss, the first pin being disposable in a first hole in the other of the first and second mating surfaces; and
e) wherein when the first body is mated to the second body with the first pin disposed in the first hole, the recessed portion of the boss provides for visual inspection of the first and second fluid fittings connected to each other.

2. The connector of claim 1 wherein the first pin is a separate rigid pin.

3. The connector of claim 1 wherein the keying feature is further comprised of a second pin extending from the distal surface of the boss of one of the first and second bodies and disposable in a second hole in the other of the first and second bodies.

4. The connector of claim 1 wherein the first fluid fitting and the second fluid fitting are a quick-connect fitting assembly.

5. The connector of claim 1 wherein the first body is further comprised of a connection end including a third port in communication with the first fluid fitting.

6. The connector of claim 5 wherein the connection end includes a retainer flange and a cap that is engageable with a fluid container.

7. The connector of claim 6 wherein the connection end includes a recessed groove for receiving a seal that is sealable with a fluid container.

8. The connector of claim 5 wherein the connection end includes a fourth port in communication with a fourth fluid fitting disposed in the first body.

9. The connector of claim 5 wherein the second body is further comprised of a fourth port in communication with the second fluid fitting.

10. A system for selecting and dispensing two or more liquids comprising:
   a) a first keyed fluid connector comprising:
      i) a first body including a first mating surface and having a first fluid fitting disposed in a first port in the first mating surface;
      ii) a second body including a second mating surface opposable to the first mating surface and having a second fluid fitting disposed in a second port in the second mating surface, the second fluid fitting connectable to the first fluid fitting;
      iii) a first boss extending from the mating surface of one of the first and second bodies to a distal boss surface thereby forming a recess between the first or second mating surface and the distal boss surface; and
      iv) a first keying feature comprising at least a first pin extending from the distal surface of the first boss of one of the first and second bodies, the first pin being disposable in a first hole in the other of the first and second mating surfaces;
   b) a second keyed fluid connector comprising:
      i) a third body including a third mating surface and having a third fluid fitting disposed in a third port in the third mating surface,
      ii) a fourth body including a fourth mating surface opposable to the third mating surface and having a fourth fluid fitting disposed in a fourth port in the fourth mating surface, the fourth fluid fitting connectable to the third fluid fitting;
      iii) a second boss extending from the mating surface of one of the third and fourth bodies to a distal boss surface thereby forming a recess between the third or fourth mating surface and the distal boss surface; and
      iv) a second keying feature comprising at least a second pin extending from the distal surface of the second boss of one of the third and fourth bodies, the second pin being disposable in a second hole in the other of the third and fourth mating surfaces;
   c) a conjoining fitting including a first inlet branch in fluid communication with the second fluid fitting of the first keyed fluid connector, a second inlet branch in fluid communication with the fourth fluid fitting of the second keyed fluid connector, and an outlet branch;
   d) wherein the first keying feature differs from the second keying feature, thereby preventing either of the first and second bodies from being connected to either of the third and fourth bodies; and
   e) wherein when the system is connected, the recessed portions of the first and second bosses provide for visual inspection of the first fluid fitting, connected to the second fluid fitting, the third fluid fitting connected to the fourth fluid fitting.

11. The system of claim 10 wherein the conjoining fitting is a selector valve.

12. The system of claim 11 further comprising a dispensing valve connectable to a fill port of an implantable power device and in fluid communication with the outlet branch of the selector valve.

13. The system of claim 12 further comprising a vacuum pump connectable to the fill port of the implantable power device through the dispensing valve.

14. The system of claim 10 further comprising a first fluid container connected to the first body of the first keyed fluid connector, and a second fluid container connected to the third body of the second keyed fluid connector.

15. The system of claim 14 further comprising a gas supply in communication with the first fluid container and the second fluid container.

16. The system of claim 15 wherein the gas supply is in communication with the first fluid container through the first body of the first keyed fluid connector and in communication with the second fluid container through the third body of the second keyed fluid connector.

17. A system for dispensing electrolyte into an implantable power device comprising:
   a) a first keyed fluid connector comprising:
      i) a first body including a first mating surface and having a first fluid fitting disposed in a first port in the first mating surface, a second body including a second mating surface opposable to the first mating surface and having a second fluid fitting disposed in a second port in the second mating surface, the second fluid fitting connectable to the first fluid fitting; and
      ii) a first keying feature comprising at least a first pin extending from one of the first and second bodies and disposable in a first hole in the other of the first and second bodies;
   b) a second keyed fluid connector comprising:
      i) a third body including a third mating surface and having a third fluid fitting disposed in a third port in the third mating surface, a fourth body including a fourth mating surface opposable to the third mating surface and having a fourth fluid fitting disposed in a fourth port in the fourth mating surface, the fourth fluid fitting connectable to the third fluid fitting; and
      ii) a second keying feature comprising at least a second pin extending from one of the third or fourth bodies and disposable in a second hole in the other of the third or fourth bodies, wherein the first keying feature differs from the second keying feature, thereby preventing either of the first and second bodies from being connected to either of the third and fourth bodies;
   c) a first fluid container connected to the first body of the first keyed fluid connector, and a second fluid container connected to the third body of the second keyed fluid connector;

d) a selector valve including a first inlet port in fluid communication with the second fluid fitting of the first keyed fluid connector, a second inlet port in fluid communication with the fourth fluid fitting of the second keyed fluid connector, and an outlet port;
e) a dispensing valve connectable to a fill port of the implantable power device and in fluid communication with the outlet port of the selector valve;
f) a vacuum pump connectable to the fill port of the implantable power device through the dispensing valve; and
g) a gas supply in communication with the first fluid container and the second fluid container.

* * * * *